(12) United States Patent
Tai et al.

(10) Patent No.: US 11,148,101 B2
(45) Date of Patent: Oct. 19, 2021

(54) FORWARD OSMOSIS MEMBRANE HAVING HIGH CHEMICAL RESISTANCE

(71) Applicant: National Tsing Hua University, Hsinchu (TW)

(72) Inventors: Nyan-Hwa Tai, Hsinchu (TW); Chi-Young Lee, Hsinchu (TW); Hsin-Hua Lee, Hsinchu (TW); Li-Han Chung, Hsinchu (TW); Guan-You Lin, Hsinchu (TW); Min-Chao Chang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/830,882

(22) Filed: Mar. 26, 2020

(65) Prior Publication Data

US 2021/0197132 A1 Jul. 1, 2021

(30) Foreign Application Priority Data

Dec. 25, 2019 (TW) .................. 108147524

(51) Int. Cl.
*B01D 69/02* (2006.01)
*B01D 71/56* (2006.01)
*B01D 61/00* (2006.01)
*B01D 69/10* (2006.01)

(52) U.S. Cl.
CPC ............ *B01D 69/02* (2013.01); *B01D 61/002* (2013.01); *B01D 69/10* (2013.01); *B01D 71/56* (2013.01); *B01D 2325/36* (2013.01)

(58) Field of Classification Search
CPC ........ B01D 69/12; B01D 71/56; B01D 69/10; B01D 61/002; C02F 1/445; B32B 2264/108; B32B 2262/02
See application file for complete search history.

(56) References Cited

U.S. PATENT DOCUMENTS

| 2010/0206811 A1 | 8/2010 | Ng et al. |
| 2012/0241371 A1* | 9/2012 | Revanur ............... B82Y 40/00 210/488 |

FOREIGN PATENT DOCUMENTS

| CN | 101720257 B | 3/2013 |
| CN | 103140278 A | 6/2013 |
| CN | 103687895 A | 3/2014 |
| CN | 101821089 B | 12/2014 |
| CN | 102574071 B | 8/2015 |
| KR | 20170092132 A | 8/2017 |

OTHER PUBLICATIONS

Search Report appended to an Office Action, which was issued to Taiwanese counterpart application No. 108147524 by the TIPO dated Nov. 4, 2020, with an English translation thereof.

* cited by examiner

*Primary Examiner* — Vishal V Vasisth (74) *Attorney, Agent, or Firm* — Hamre, Schumann, Mueller & Larson, P.C.

(57) ABSTRACT

A forward osmosis membrane having a high chemical resistance includes a backing layer, a selective layer, and a hydrophilic support layer sandwiched between the backing layer and the selective layer. The hydrophilic support layer includes a plurality of nanostructures, each of which includes a carbon nanotube and a hydrophilic film coated around the carbon nanotube, and has an outer layer defined by the hydrophilic films of the nanostructures to prevent the selective layer from penetrating into the hydrophilic support layer.

4 Claims, 11 Drawing Sheets

FIG. 14

# FORWARD OSMOSIS MEMBRANE HAVING HIGH CHEMICAL RESISTANCE

CROSS-REFERENCE TO RELATED APPLICATION

This application claims priority of Taiwanese Invention Patent Application No. 108147524, filed on Dec. 25, 2019.

FIELD

The disclosure relates to a forward osmosis membrane, and more particularly to a forward osmosis membrane having a high chemical resistance.

BACKGROUND

Reverse osmosis has been widely used in past decades to remove contaminants from water source. Application of an external pressure during reverse osmosis might result in an increased energy consumption. On the contrary, no external pressure is necessary in a forward osmosis process, which utilizes an osmotic pressure gradient formed by a concentration difference of solutes in solution on two sides of a forward osmosis membrane for purifying water. Therefore, in recent years, forward osmosis has received an increased interest in industrial developments for water purification. A conventional forward osmosis membrane includes a backing layer, a polymeric support layer formed on the backing layer, and a selective layer formed on the polymeric support layer.

Figure 1:
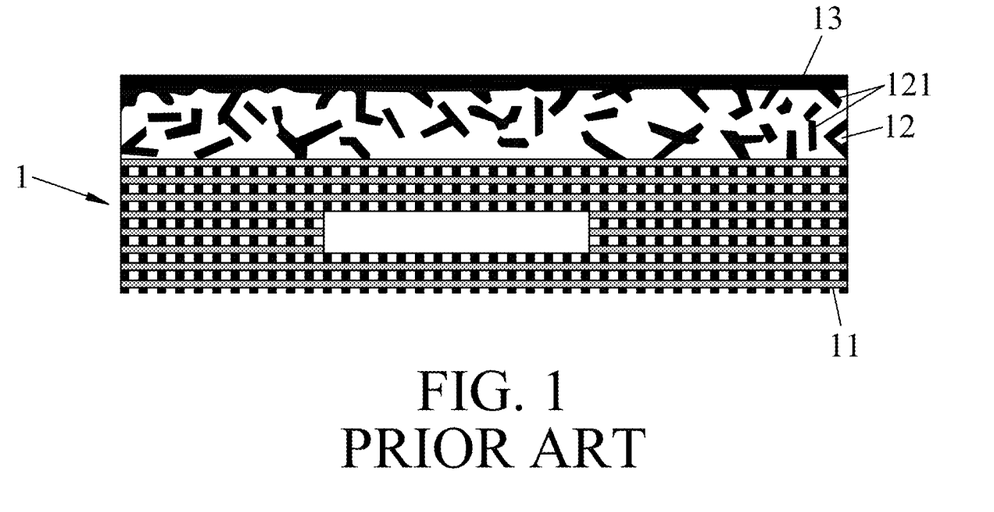
FIG. 1 is a schematic view illustrating a composite semi-permeable membrane disclosed in Chinese Invention Patent Publication No. 101821089B.

Referring to FIG. 1, Chinese Invention Patent Publication No. 101821089B, which is a corresponding application of U.S. Patent Publication No. 2010/0206811, discloses a composite semi-permeable membrane 1, which includes a fabric support layer 11, a polymer membrane 12 casted on the fabric support layer 11, and a skin layer 13 casted on the polymeric membrane 12. The fabric support layer 11 may be made of polyamide or polyacrylonitrile. The polymer membrane 12 has a plurality of nanotubes 121 dispersed therein, and is a polyamide film formed by interfacial copolymerization of a polyfunctional amine solution and a polyfunctional acid halide solution. The skin layer 13 is a remnant of the interfacial copolymerization reaction.

Figure 2:
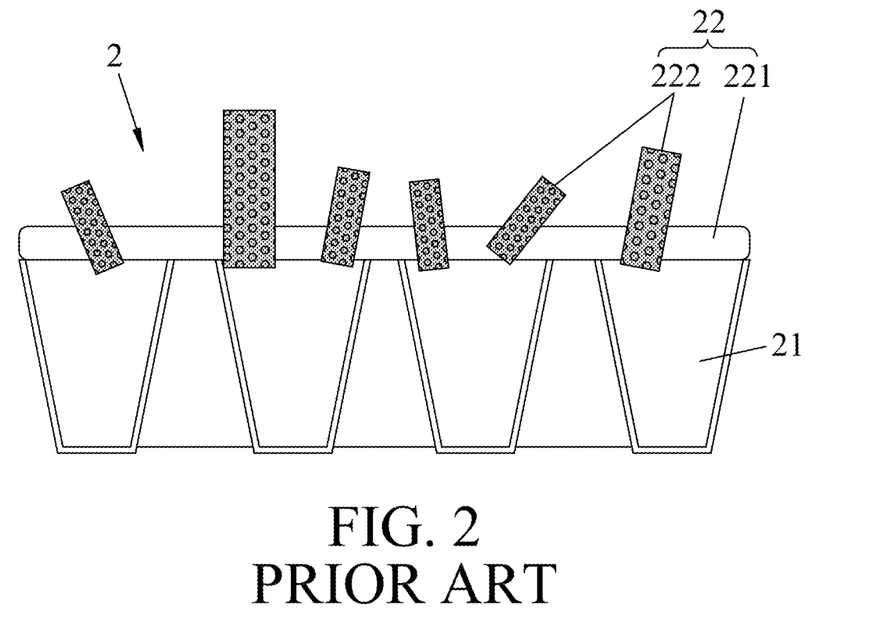
FIG. 2 is a schematic view illustrating an ultra-thin carbon nanotube composite membrane disclosed in Korean Invention Patent Publication No. 10-2017-0092132.

Referring to FIG. 2, Korean Invention Patent Publication No. 10-2017-0092132 discloses an ultra-thin carbon nanotube composite membrane 2 for forward osmosis. The ultra-thin carbon nanotube composite membrane 2 includes a backing layer (not shown) made of non-woven fabric, a support layer 21 formed on the backing layer, and a selective layer 22 formed on the support layer 21. The support layer 21 is made of polyimide, and the selective layer 22 includes a polyamide film 221 having a plurality of hydrophilic carbon nanotubes 222 dispersed therein.

Both the polymer membrane 12 of the composite semi-permeable membrane 1 shown in FIG. 1 and the support layer 21 (i.e., made of polyimide) of the ultra-thin carbon nanotube composite membrane 2 shown in FIG. 2 are made of polymeric materials. Therefore, when the composite semi-permeable membrane 1 and the ultra-thin carbon nanotube composite membrane 2 are used for forward osmosis to purify water in extreme environment (e.g., to purify waste water containing organic contaminants), the polymer membrane 12 of the composite semi-permeable membrane 1 and the support layer 21 of the ultra-thin carbon nanotube composite membrane 2 may be eroded by the organic contaminants in the waste water.

Based on the above, it remains a goal to extend a service life of the forward osmosis membrane by increasing a chemical resistance thereof.

SUMMARY

Therefore, an object of the disclosure is to provide a forward osmosis membrane having a high chemical resistance that can alleviate or eliminate at least one of the drawbacks of the prior art.

According to the disclosure, there is provided a forward osmosis membrane which includes a backing layer, a selective layer, and a hydrophilic support layer sandwiched between the backing layer and the selective layer. The hydrophilic support layer includes a plurality of nanostructures, each of which includes a carbon nanotube and a hydrophilic film coated around the carbon nanotube. The hydrophilic support layer has an outer layer which is defined by the hydrophilic films of the nanostructures to prevent the selective layer from penetrating into the hydrophilic support layer.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Before the disclosure is described in greater detail, it should be noted that where considered appropriate, reference numerals have been repeated among the figures to indicate corresponding or analogous elements, which may optionally have similar characteristics.

Figure 3:
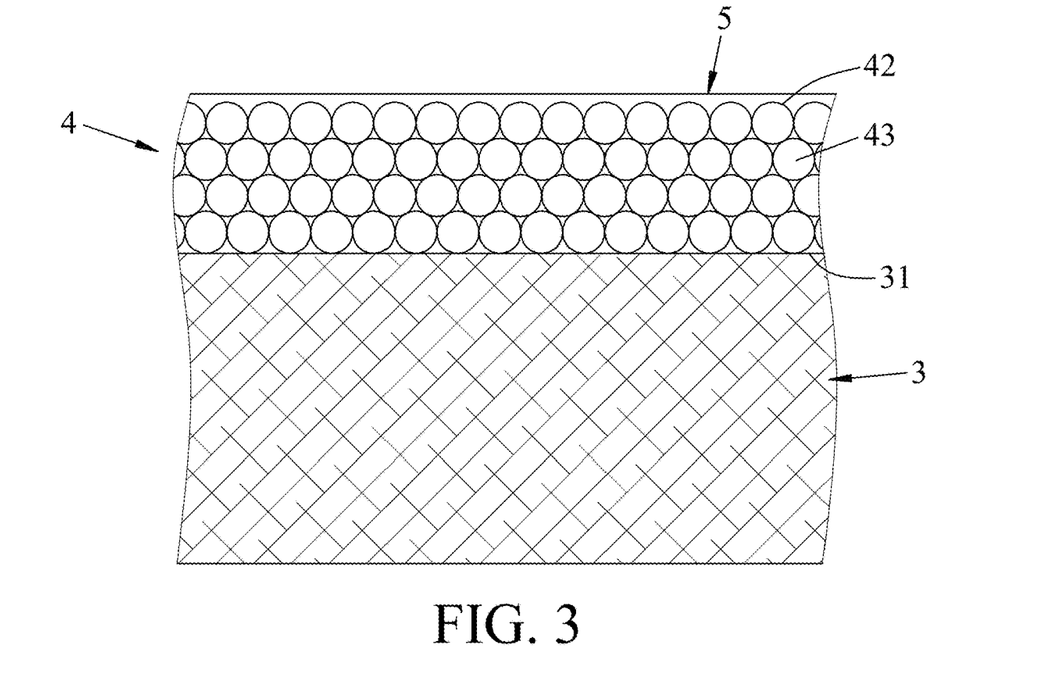
FIG. 3 is a fragmentary schematic view illustrating an embodiment of a forward osmosis membrane according to the disclosure.
Figure 4:
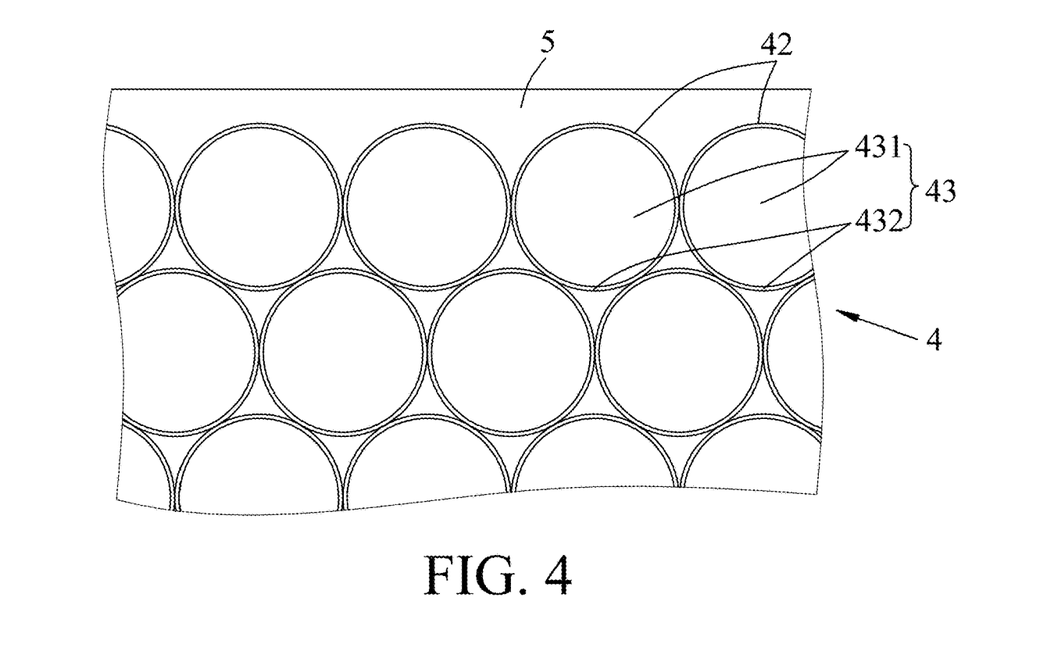
FIG. 4 is a partially enlarged fragmentary view of FIG. 3, illustrating a hydrophilic support layer and a selective layer of the embodiment of the forward osmosis membrane.

Referring to FIGS. 3 and 4, an embodiment of a forward osmosis membrane having a high chemical resistance of the disclosure includes a backing layer 3, a selective layer 5, and a hydrophilic support layer 4 sandwiched between the backing layer 3 and the selective layer 5.

The hydrophilic support layer 4 includes a plurality of nanostructures 43, each of which includes a carbon nanotube 431 and a hydrophilic film 432 coated around the carbon nanotube 431, and an outer layer 42 which is defined by the hydrophilic films 432 of the nanostructures 43 to prevent the selective layer 5 from penetrating into the hydrophilic support layer 4. The hydrophilic films 432 may be made of polydopamine, poly(acrylic acid), polvaniline, polycaprolactone, or combinations thereof. In this embodiment, hydrophilic films 432 are made of polydopamine. The selective layer 5 may be made of polyamide, polyamide-imide, poly(piperazine amide), or combinations thereof. In this embodiment, the selective layer 5 is made of polyamide.

It should be noted that, the forward osmosis membrane of the disclosure only relies on the nanostructures 43 in the hydrophilic support layer 4 as a structural support for fluid flow. When the hydrophilic support layer 4 has a thickness that is too small, it may be damaged during use. On the other hand, when the thickness is too large, water flux of the forward osmosis membrane may be adversely affected. Therefore, in this embodiment, the hydrophilic support layer 4 may have a thickness ranging from 1 μm to 10 μm.

A method for manufacturing the embodiment of the forward osmosis membrane of the disclosure includes at least the following steps:

a) producing a first pCNT (polydopamine-coated carbon nanotubes) dispersion 401;

b) forming the hydrophilic support layer 4 with the first pCNT dispersion 401; and c) forming the selective layer 5 on the hydrophilic support layer 4 to obtain the forward osmosis membrane.

To be specific, in step a), 1.21 g of tris(hydroxymethyl) aminomethane (hereinafter abbreviated as Tris, 99.8% purity; purchased from Acros Organics) and 1 L of deionized water were mixed to form a Tris solution, and then a 1 M hydrochloric acid (HCl) was added into the Tris solution while adjusting the pH of the Tris solution until the pH thereof reached 8.5, so as to obtain a 10 mM weak base buffer (Tris-HCl). Thereafter, 2 g of dopamine hydrochloride (99% purity or above; purchased from Sigma-Aldrich Corporation) was mixed with 1 L of the weak base buffer to obtain a light-brown dopamine solution. Next, a multi-walled carbon nanotube dispersion (purchased from Taiwan Carbon Nanotube Technology Corporation; Model: CDW-381) was added into the dopamine solution with a weight ratio of the multi-walled carbon nanotube dispersion to the dopamine solution of 1:5.5, so as to form a buffer solution. The buffer solution was then stirred with a magnetic stirrer at 30° C. in darkness, and kept in the same environment for 15 hours to permit the dopamine in the buffer solution to undergo auto-polymerization, so as to form a layer of polydopamine coated around each of the carbon nanotubes, i.e., to form the pCNT. After that, the buffer solution was subjected to centrifugal separation under a rotation speed of 40000 rpm for 90 minutes to obtain a pCNT slurry, which was then added with 0.05 wt % of dodecanoic acid (99% purity or above; purchased from Sigma-Aldrich Corporation) and stirred to form the first pCNT dispersion 401 (see FIG. 5).

Figure 5:
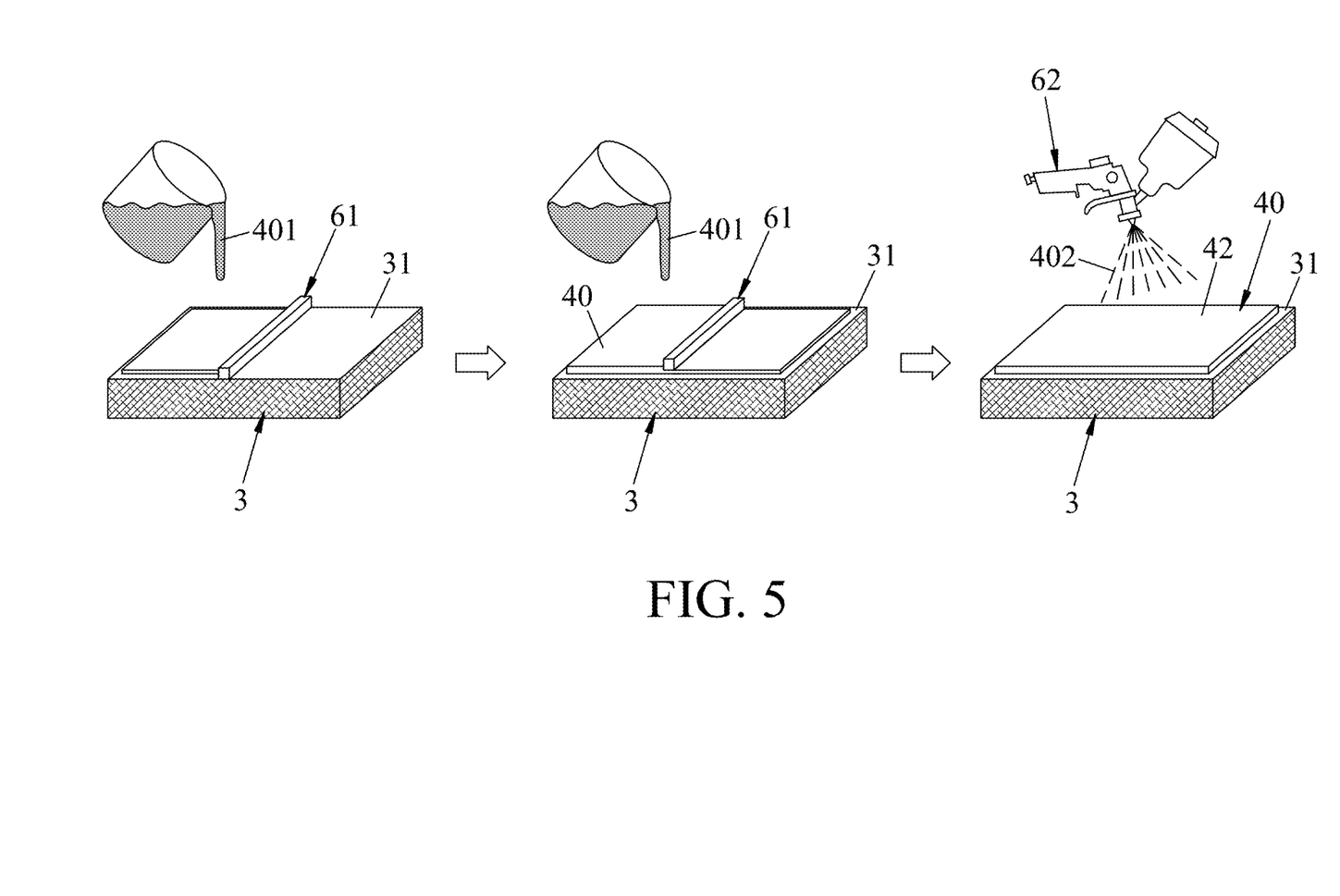
FIG. 5 is a perspective view illustrating consecutive steps for making the hydrophilic support layer of the embodiment of the forward osmosis membrane.

Referring to FIG. 5, in step b), the first pCNT dispersion 401 was placed in an ultrasonic cleaner (Manufacturer: Delta Ultrasonic Co., Ltd; Model: DC150) (not shown) for an hour to reduce conglomeration of the carbon nanotubes 431. Then, the first pCNT dispersion 401 was stood for 12 hours to remove bubbles therein. Next, a first spreading of the first pCNT dispersion 401 was performed on a surface 31 of the backing layer 3 using a scraper 61, followed by drying at a temperature of 80° C., and then a second spreading of the first pCNT dispersion 401 was performed, followed by drying at a temperature of 80° C. to form a preformed layer 40. Thereafter, the first pCNT dispersion 401 was diluted with deionized water to obtain a second pCNT dispersion 402 having a concentration of 1.5 wt % of pCNT based on a total weight of the second pCNT dispersion 402. Subsequently, the second pCNT dispersion 402 was sprayed on an outer layer 42 of the preformed layer 40 using a spray gun 62 (Manufacturer: Taizhou Yanzhi Pneumatic Tools; Model: W-71) under a nitrogen pressure of 1 kg/cm$^3$, followed by drying at a temperature of 80° C. to form the hydrophilic support layer 4 on the surface 31 of the backing layer 3. The hydrophilic support layer 4 and the backing layer 3 cooperatively define a pCNT substrate 60.

In this embodiment, the backing layer 3 is made of AS030 PET non-woven fabric (thickness: 30 μm) or AS066 PET non-woven fabric (thickness: 60 μm) available from Asahi Kasei Fibers Corporation.

It should be noted that, the second pCNT dispersion 402 was sprayed on the preformed layer 40 to fill in voids formed during the first and second spreadings of the first pCNT dispersion 401, and to fill in the spaces between two adjacent ones of the hydrophilic films 432 (i.e., the polydopamine coated around the carbon nanotubes 431) on the outer layer 42 of the hydrophilic support layer 4, so as to prevent the selective layer 5 to be formed from penetrating into the hydrophilic support layer 4 through the outer layer 42.

Figure 6:
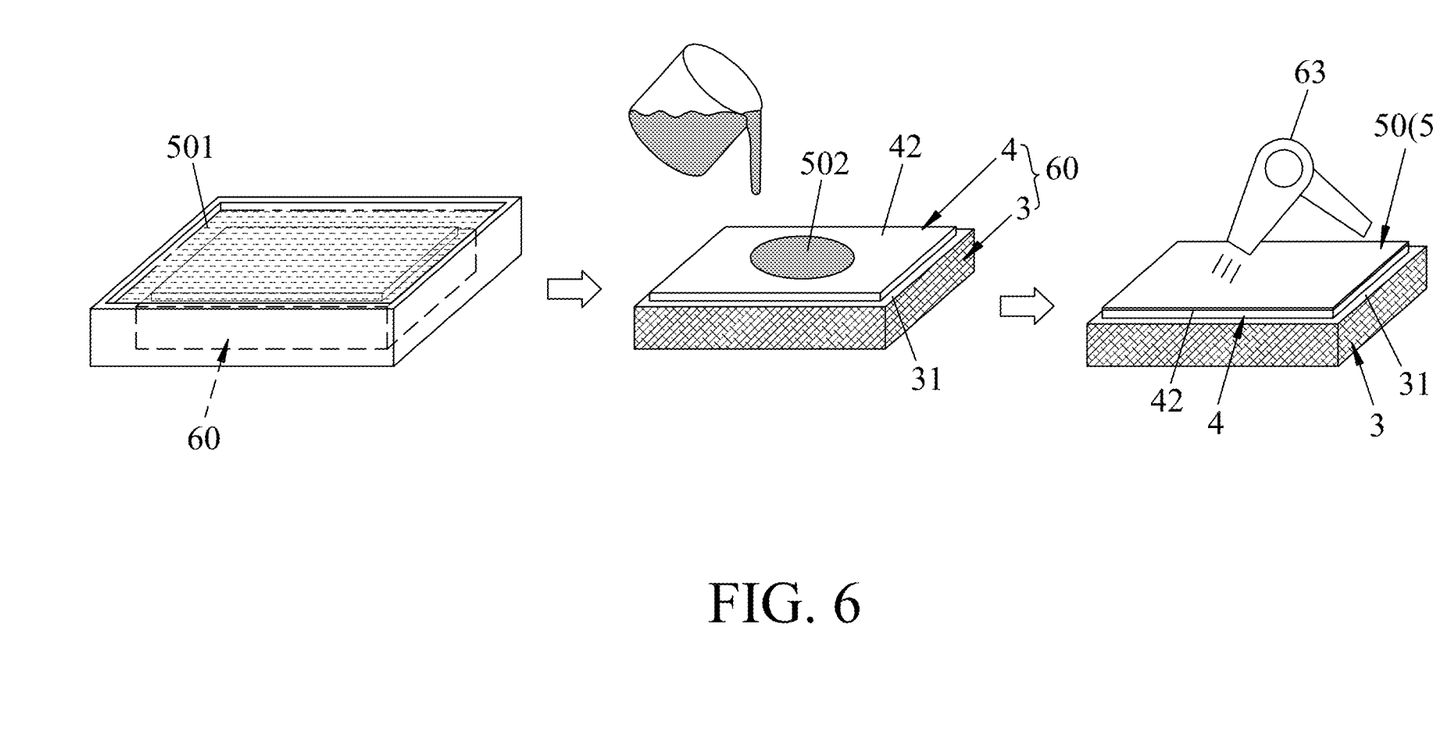
FIG. 6 is a perspective view illustrating consecutive steps for making the selective layer of the embodiment of the forward osmosis membrane.

In step c), m-phenylenediamine (99% purity; purchased from Sigma-Aldrich Corporation, and hereinafter abbreviated as MPD) was dissolved in deionized water to obtain a 2 wt % MPD aqueous solution 501, and tri-mesoyl chloride (98% purity; purchased from Alfa Aesar, and hereinafter abbreviated as TMC) was dissolved in n-hexane (99% purity; purchased from Macron Fine Chemicals) to obtain a 1 wt % TMC organic solution 502 (see FIG. 6). Then, the pCNT substrate 60 was submerged in deionized water for 2 minutes, and then placed on a glass plate to be dried with an acrylic stick (not shown) until a surface of the pCNT substrate 60 was free of water droplets. Thereafter, the pCNT substrate 60 was submerged in the MPD aqueous solution 501 for 3 minutes to: fully absorb the MPD aqueous solution 501, and then placed on the glass plate and dried with the acrylic stick in the same manner as mentioned above. Next, the four sides of the pCNT substrate 60 were fixed to a mold (not shown), and the TMC organic solution 502 was poured onto the outer layer 42 of the hydrophilic support layer 4 of the pCNT substrate 60 to initiate an interfacial polymerization reaction with the MPD aqueous solution 501 for 60 seconds, so as to form a polyamide (PA) layer 50 on the outer layer 42 of the hydrophilic support layer 4. Subsequently, remnant of the TMC organic solution 502 was removed, and then the PA layer 50 was dried for 10 seconds using a dryer 63, which was held 3 cm above the PA layer 50 to increase cross-linking between polymer chains in the PA layer 50, thereby obtaining the selective layer 5.

It should be noted that, the pCNT substrate 60 fully absorbed with the MPD aqueous solution 501 had to be dried with the acrylic stick until the surface of the pCNT substrate 60 was free of liquid droplets so as to prevent the MPD aqueous solution 501 from seeping into the hydrophilic support layer 4, thereby reducing a chance of polyamide forming in the hydrophilic support layer 4.

<Evaluations>

In the following evaluations, examples of the forward osmosis membranes having the backing layer 3 made of the AS030 PET non-woven fabric and that made of the AS066 PET non-woven fabric are respectively denoted as Example 1 and Example 2 for the sake of brevity.

Figure 7:
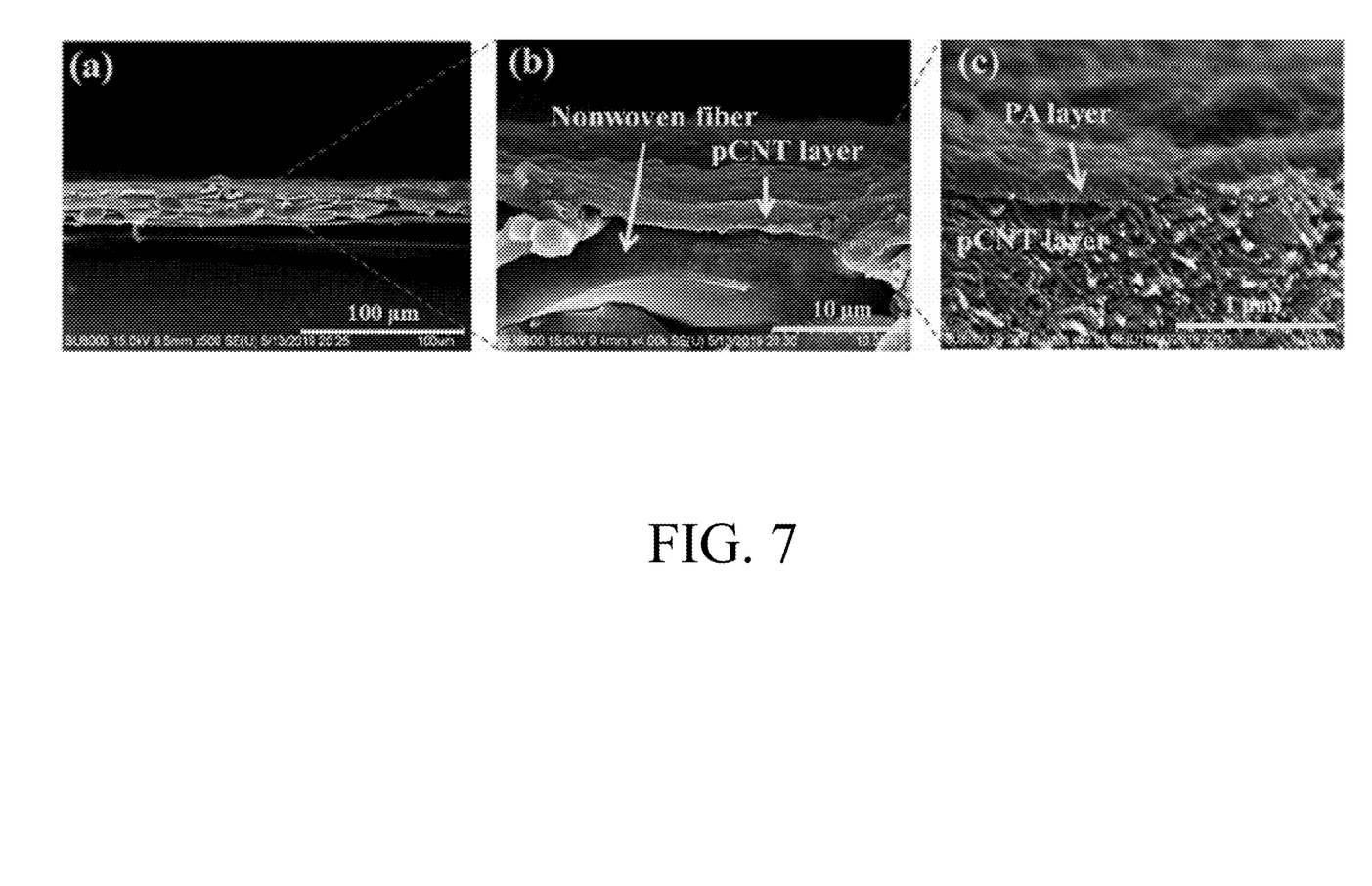
FIG. 7 are scanning electron microscope (SEM) images illustrating a cross section of the forward osmosis membrane of Example 1.

1. Scanning Electron Microscope (SEM):

Referring to FIGS. 3 and 7, SEM images of a cross section of the forward osmosis membranes of Example 1 show that the hydrophilic support layer 4 (denoted as pCNT layer in FIG. 7(b)) is sandwiched between the backing layer 3 (denoted as Nonwoven layer in FIG. 7(b) and the selective layer 5 (denoted as PA layer in FIG. 7(c)). The hydrophilic support layer 4 has a thickness of approximately 3 μm to 5 μm, and the selective layer 5 has a thickness of approximately 200 nm.

Figure 8:
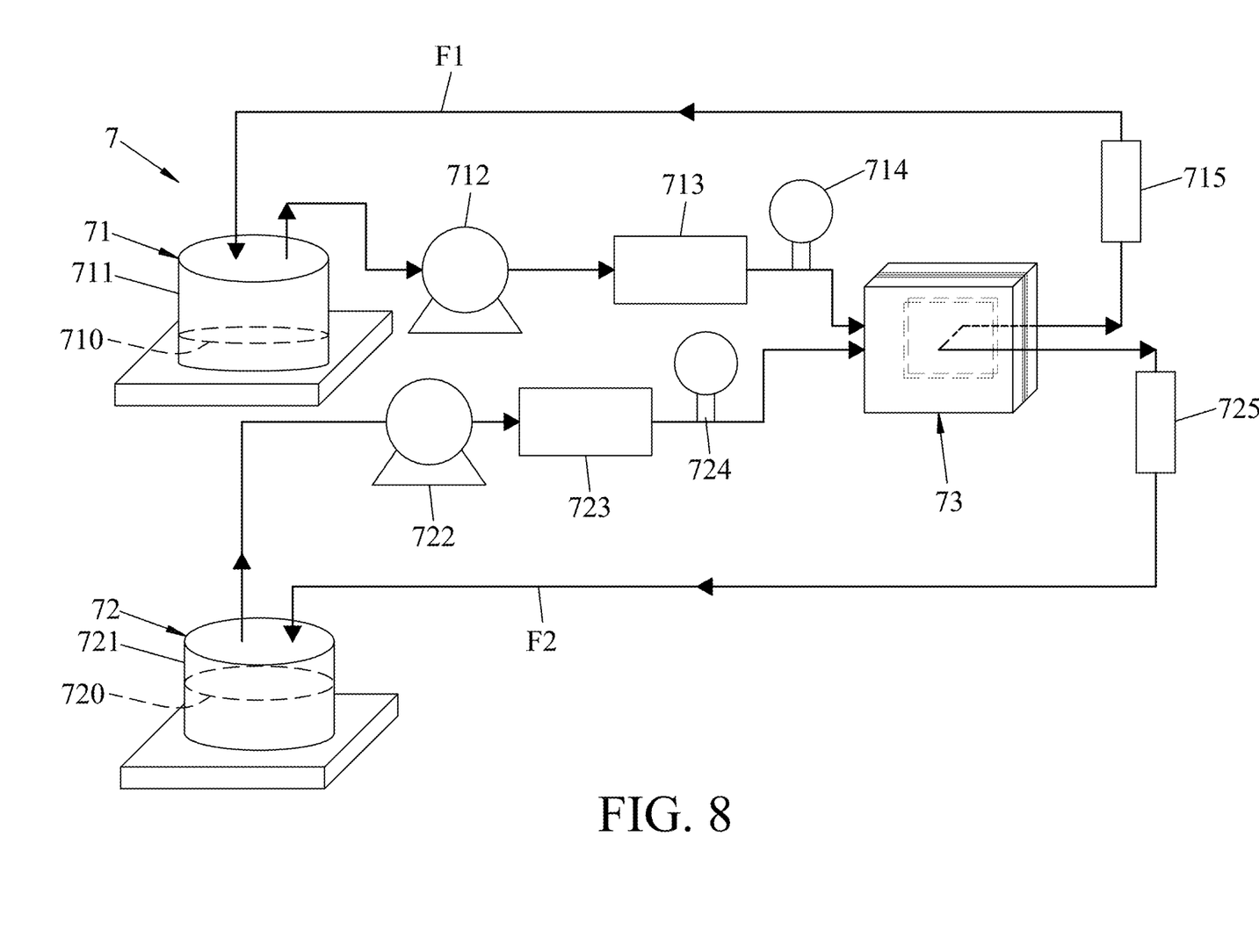
FIG. 8 is a schematic view illustrating a cross-flow system for measuring forward osmosis performance of the forward osmosis membrane of Examples 1 and 2.
Figure 9:
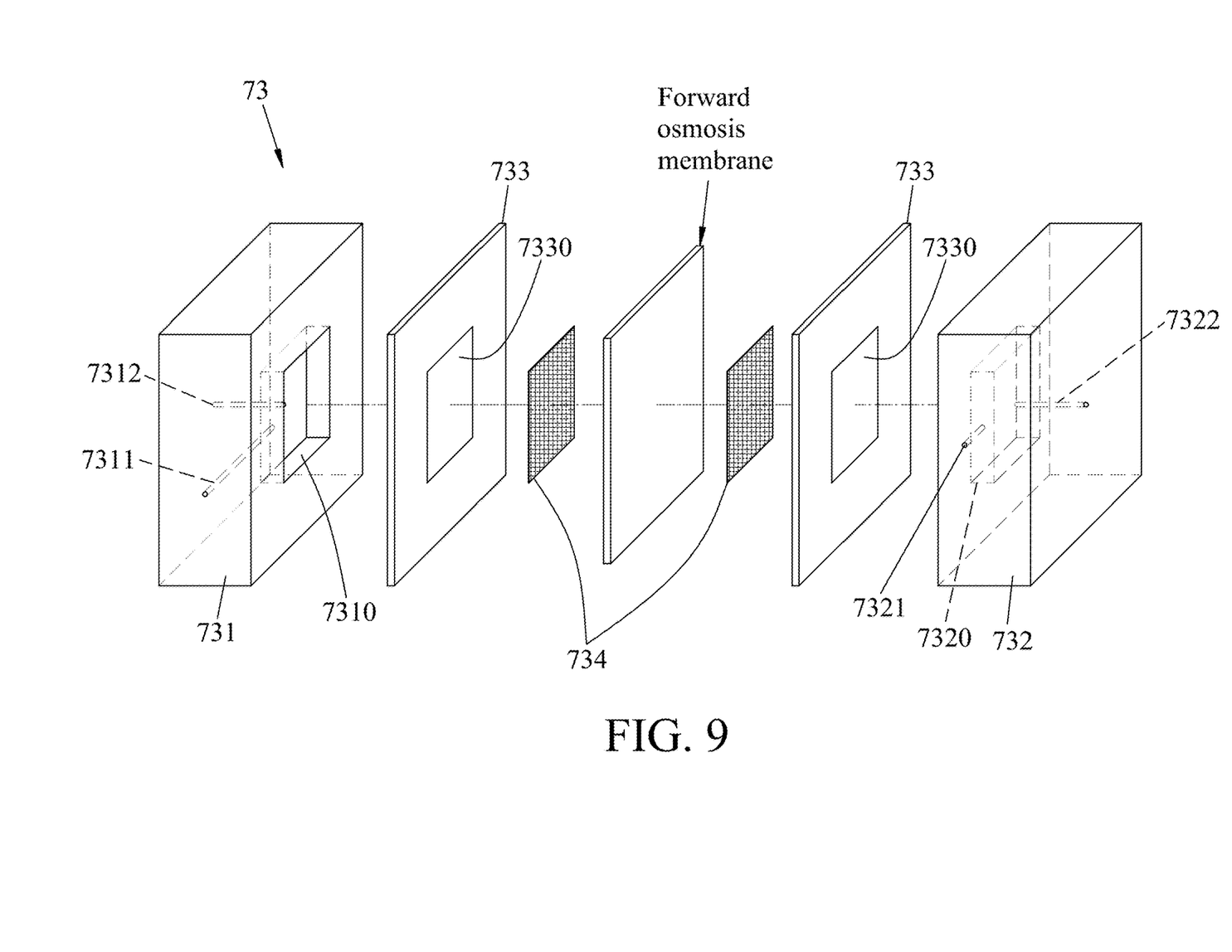
FIG. 9 is an exploded perspective view of a membrane module of the cross-flow system of FIG. 8.

2. Forward Osmosis Performance:

Referring to FIGS. 8 and 9, a cross-flow system 7 for measuring a water flux (Jw) and a reverse salt flux (Js) of the forward osmosis membrane is illustrated. The cross-flow system 7 includes a feed unit 71, a draw unit 72, and a membrane module 73 independently connected to each of the feed unit 71 and the draw unit 72. The term "cross-flow" indicates that a direction of liquid entering the membrane module 73 is parallel to a major surface of the forward osmosis membrane in the membrane module 73 and perpendicular to a direction of liquid exiting the membrane module 73.

As shown in FIG. 8, the feed unit 71 includes, along a feed direction (F1), a feed container 711 for containing a feed solution 710, a pump 712, a flow meter 713, a pressure meter 714, and a conductivity meter 715. Similarly, the draw unit 72 includes, along a draw direction (F2), a draw container 721 for containing a draw solution 720, a pump 722, a flow meter 723, a pressure meter 724, and a conductivity meter 725. The membrane module 73 is located between the pressure meters 714, 724 and the conductivity meters 715, 725 of the feed and draw units 71, 72.

As shown in FIG. 9, the membrane module 73 includes a first mold half 731 for the feed unit 71 and a second mold half 732 for the draw unit 72. The first and second mold halves 731, 732 are spaced apart from each other and are made of acrylic. Each of the first and second mold halves 731, 732 has an indentation 7310, 7320, a liquid-entry channel 7311, 7321, and a liquid-exit channel 7312, 7322, respectively. The indentation 7310 of the first mold half 731 and the indentation 7320 of the second mold half 732 are faced toward each other. The liquid-entry channels 7311, 7321 extend in the direction of liquid entering the forward osmosis membrane, and are perpendicular to the liquid-exit channels 7312, 7322, which extend in the direction of liquid exiting the forward osmosis membrane. In the first mold half 731, the liquid-entry channel 7311 and the liquid-exit channel 7312 are connected to the indentation 7310. Similarly, in the second mold half 732, the liquid-entry channel 7321 and the liquid-exit channel 7322 are connected to the indentation 7320. The membrane module 73 further includes a pair of silicone pads 733 and a pair of plastic nets 734. Each of the silicone pads 733 is in contact with a corresponding one of the first and second mold halves 731, 732, and has a through hole 7330 aligning with a corresponding one of the indentations 7310, 7320. Each of the plastic nets 734 covers the through hole 7330 of a corresponding one of the silicone pads 733. In this embodiment, the forward osmosis membrane of the disclosure (i.e., Example 1 or Example 2) is sandwiched between the silicone pads 733 such that the plastic nets 734 on opposite sides of the forward osmosis membrane may provide a mechanical strength for supporting the forward osmosis membrane during a test for the forward osmosis performance (i.e., water flux and reverse salt flux). The through hole 7330 of each of the silicone pads 733 has an area of 4 cm×4 cm. Therefore, each of the plastic nets 734 also has an area of 4 cm×4 cm. In other words, an effective area of the forward osmosis membrane during the test for the forward osmosis performance is 16 cm$^2$.

To be specific, the membrane module 73 has two independent circulation systems. During the test for the forward osmosis performance, the feed solution 710 is pumped by the pump 712 to flow through the flow meter 713, the pressure meter 714, the membrane module 73, and the conductivity meter 715 in a feed circulation system. The flow velocity, the pressure, and the conductivity of the feed solution 710 in the feed circulation system are monitored by the flow meter 713, the pressure meter 714, and the conductivity meter 715, respectively. Similarly, in the same test, the draw solution 720 is pumped by the pump 722 to flow through the flow meter 723, the pressure meter 724, the membrane module 73, and the conductivity meter 725 in a draw circulation system. The flow velocity, the pressure, and the conductivity of the draw solution 720 in the draw circulation system are monitored by the flow meter 723, the pressure meter 724, and the conductivity meter 725, respectively.

In the test for the forward osmosis performance of the embodiment of the forward osmosis membrane of the disclosure, 800 ml of the feed solution 710 was placed in the feed container 711, and 600 ml of the draw solution 720 was placed in the draw container 721. The feed solution 710 was deionized water, and the draw solution 720 was salt water having various concentrations of sodium chloride (NaCl) (e.g., 0.5 M, 1.0 M, 1.5 M, and 2.0 M). In addition, the test was performed in a forward osmosis mode and a pressure-retarded osmosis mode at a flow velocity of 25 cm/s. In the forward osmosis mode, the selective layer 5 of the forward osmosis membrane was faced toward the feed unit 71, and in the pressure-retarded osmosis mode, the selective layer 5 was faced toward the draw unit 72.

Figure 10:
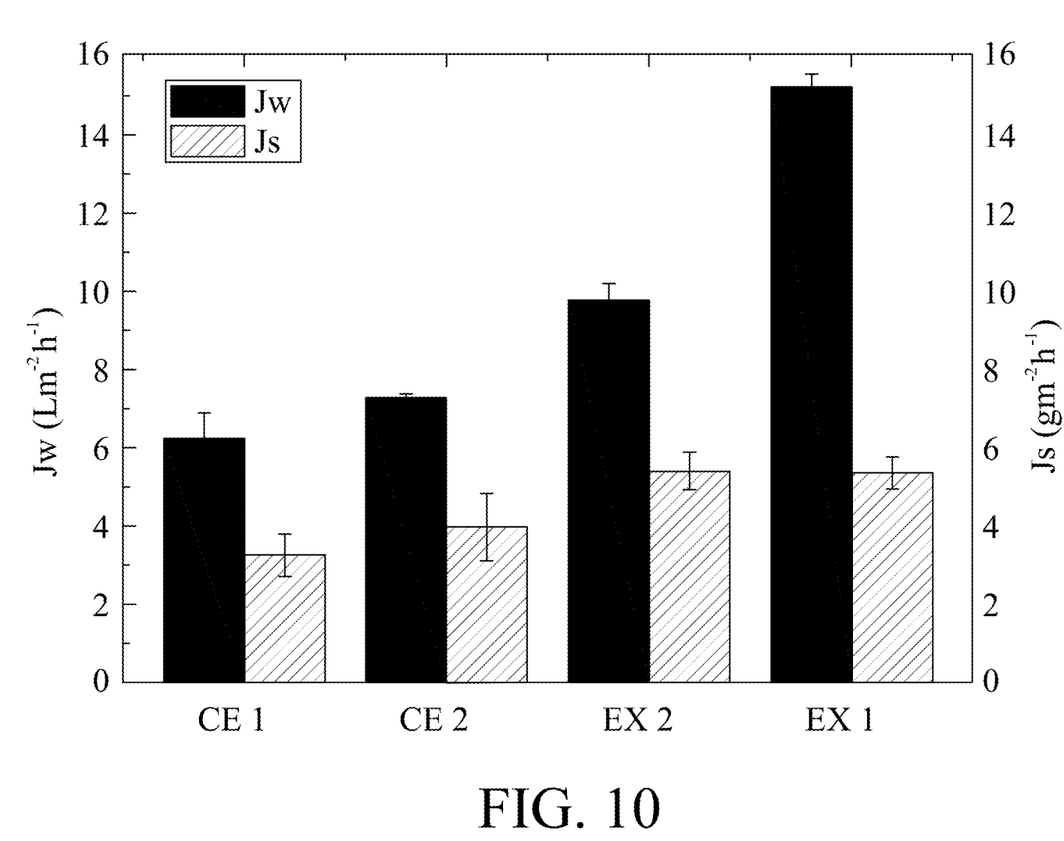
FIG. 10 is a bar graph illustrating a comparison between water flux of Example 2 and that of Example 1.

As shown in FIG. 10, water flux (Jw) and reverse salt flux (Js) of the forward osmosis membranes of Example 1 (EX 1), Example 2 (EX 2), Comparison Example 1 (CE 1) and Comparison Example 2 (CE 2) were measured in the forward osmosis mode using a 1.0 M salt water as the draw solution 720. The forward osmosis membrane of CE 1 is similar to that of EX 2 except that the carbon nanotubes 431 in the hydrophilic support layer 4 of CE 1 were not coated with the hydrophilic film 432 (i.e., polydopamine). The forward osmosis membrane of CE 2 is similar to that of EX 2 except that the polydopamine (i.e., hydrophilic film 432) of the hydrophilic support layer 4 is not coated around the carbon nanotubes 431. To be specific, the hydrophilic support layer 4 of CE 2 is made by first applying the multi-walled carbon nanotube dispersion on the backing layer 3

(AS066 PET non-woven fabric), and then drying to obtain a semi-product, followed by submerging the semi-product into the dopamine solution for polymerization to obtain the hydrophilic support layer 4 of CE 2. It can be seen that, the forward osmosis membrane of EX 2 has a water flux of approximately 10 $Lm^{-2}h^{-1}$, and a reverse salt flux of approximately 5 $gm^{-2}h^{-1}$, which are higher than those of CE 1 and CE 2. In addition, the forward osmosis membrane of EX 1 has a water flux of 15.1 $Lm^{-2}h^{-1}$ and a reverse salt flux of 5.3 $gm^{-2}h^{-1}$. The water flux of EX 1 is higher than that of EX 2 since the backing layer 3 of EX 1 has a thickness (30 μm) smaller than that of EX 2 (66 μm). Since the carbon nanotubes 431 of the hydrophilic support layer 4 of the forward osmosis membrane of the disclosure are coated with the hydrophilic films 432 and the outer layer 42 is defined by the hydrophilic films 432 of the nanostructures 43 to prevent the selective layer 5 from penetrating into the hydrophilic support layer 4, the hydrophilic support layer 4 of the forward osmosis membrane of the disclosure will not be filled with the material that forms the selective layer 5, and it is easier for water to flow therethrough.

Figure 11:
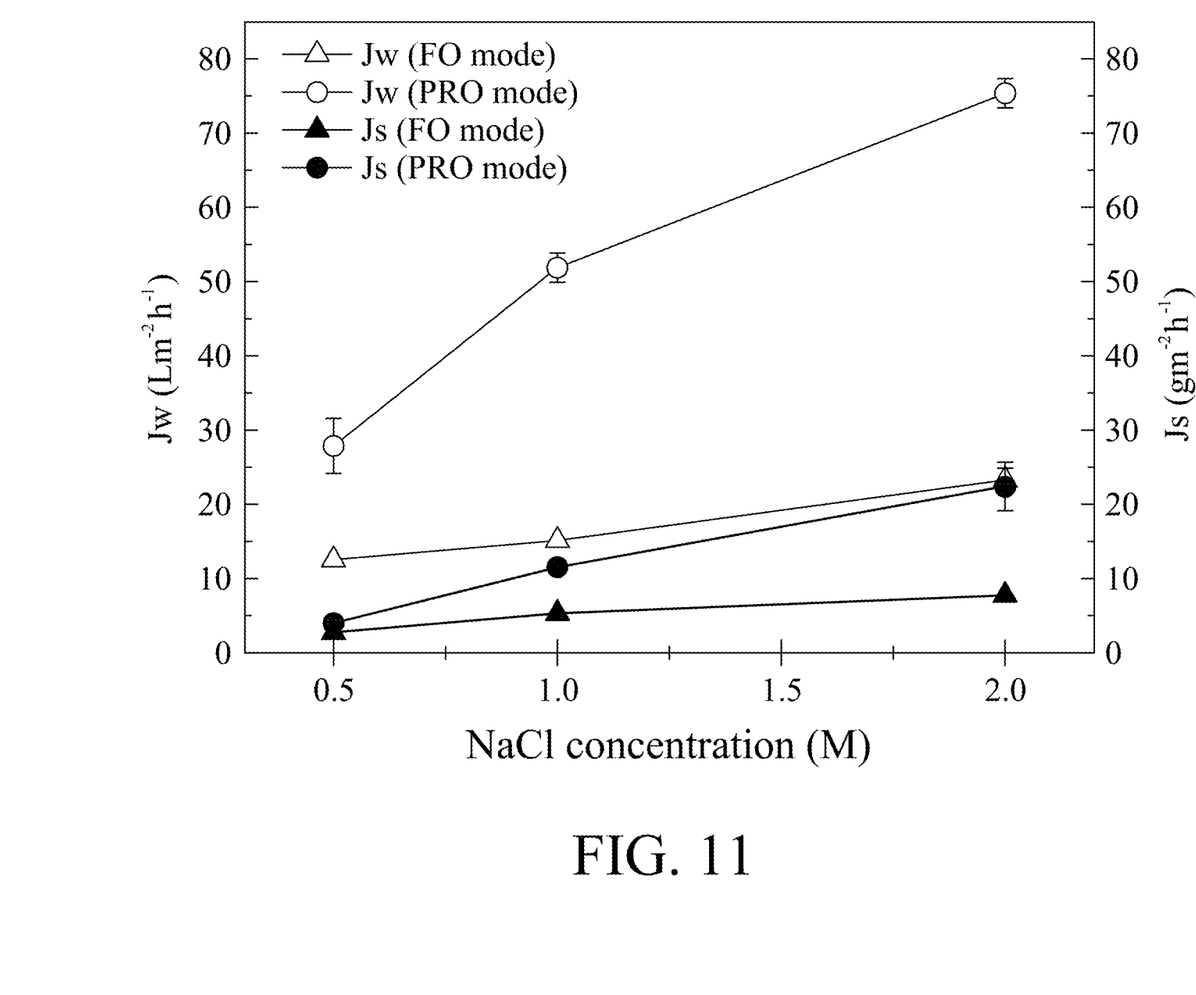
FIG. 11 is a line chart illustrating change in water flux (Jw) and reverse salt flux (Js) corresponding to an increasing salt concentration in a draw solution of Example 1 which is used in the cross-flow system.

As shown in FIG. 11, the water flux (Jw) of Example 1 increases with increasing concentration of NaCl in the salt water of the draw solution 720 in both the forward osmosis (FO) mode and the pressure-retarded osmosis (PRO) mode. When the draw solution 720 has a NaCl concentration of 2.0 M, the water flux of Example 1 reaches 23.3 $Lm^{-2}h^{-1}$ in the FO mode, and reaches 75.3 $Lm^{-2}h^{-1}$ in the PRO mode. Under the same condition, the reverse salt flux (Js) of Example 1 is controlled to be lower than 8 $gm^{-2}h^{-1}$ in the FO mode, and close to 20 $gm^{-2}h^{-1}$ in the PRO mode. In other words, a ratio of the reverse salt flux to the water flux (hereinafter abbreviated as a Js/Jw ratio) is approximately 0.3 when the draw solution 720 has a NaCl concentration of 2.0 M (see Table 1 below), which is advantageous for water purification.

TABLE 1

| | Concentration of NaCl in the draw solution 720 (M) * | FO mode | | | PRO mode | | |
|---|---|---|---|---|---|---|---|
| | | Jw | Js | Js/Jw | Jw | Js | Js/Jw |
| EX 1 | 0.5 | 12.4 | 2.7 | 0.22 | 27.4 | 4.0 | 0.15 |
| | 1.0 | 15.1 | 5.3 | 0.35 | 51.9 | 11.6 | 0.22 |
| | 2.0 | 23.3 | 7.9 | 0.34 | 75.3 | 22.5 | 0.30 |
| HTI-TIA | 1.0 | 9.5 | 1.3 | 0.14 | 18.0 | 7.5 | 0.42 |

* The flow velocity for each test is 25 cm/s.

As shown in Table 1 above, a commercially available forward osmosis membrane (Manufacturer: HTI Water; Model: TIA, hereinafter abbreviated as HTI-TIA) was also tested for the forward osmosis performance in different modes using the draw solution 720 having a salt concentration of 1.0 M. The forward osmosis performance of HTI-TIA as shown in Table 1 was disclosed in "A novel TFC-type FO membrane with inserted sublayer of carbon nanotube networks exhibiting the improved separation performance" authored by Zhao et al., and published in "Desalination" Vol. 413, pages 176 to 183 in 2017. A comparison between the results of EX 1 and those disclosed by Zhao et al. shows that, when the draw solution 720 has a salt concentration of 1.0 M, the Js/Jw ratio (0.35) in the FO mode of EX 1 is only slightly greater than that (0.14) of HTI-TIA used by Zhao et al., and the Js/Jw ratio (0.22) in the PRO mode of EX 1 is smaller than that (0.42) of HTI-TIA. Therefore, the forward osmosis membrane of the disclosure shows great potential for applications in water purification.

3. Rejection Rate (R):

A rejection rate of the forward osmosis membrane is a percentage of undesired contaminants in the feed solution 710 being blocked from entering the draw solution 720. The rejection rate of Example 1 was measured by using each of two organic solutions as the feed solution 710 in the cross-flow system 7. To be specific, one of the organic solutions was 800 ml of a 2 wt % of n-methyl-2-pyrrolidone (hereinafter abbreviated as NMP) solution, and the other of the organic solutions was 800 ml of a 2 wt % dimethyl sulfoxide (hereinafter abbreviated as DMSO) solution. In addition, 600 ml of a 15 wt % of sodium sulfate ($Na_2SO_4$) solution was used as the draw solution 720, and each test for each of the two organic solutions was performed for 25 hours. After the tests, the rejection rates for NMP and DMSO were calculated using the equation below:

$$R = \left(1 - \frac{C_p}{C_f}\right) \times 100\%$$

wherein $C_f$ is an initial concentration of an organic contaminant (i.e., NMP or DMSO) in the feed solution 710, and $C_p$ is a concentration of the organic contaminant in the draw solution 720 after exiting the membrane module 73, both of which were measured using titration.

Figure 12:
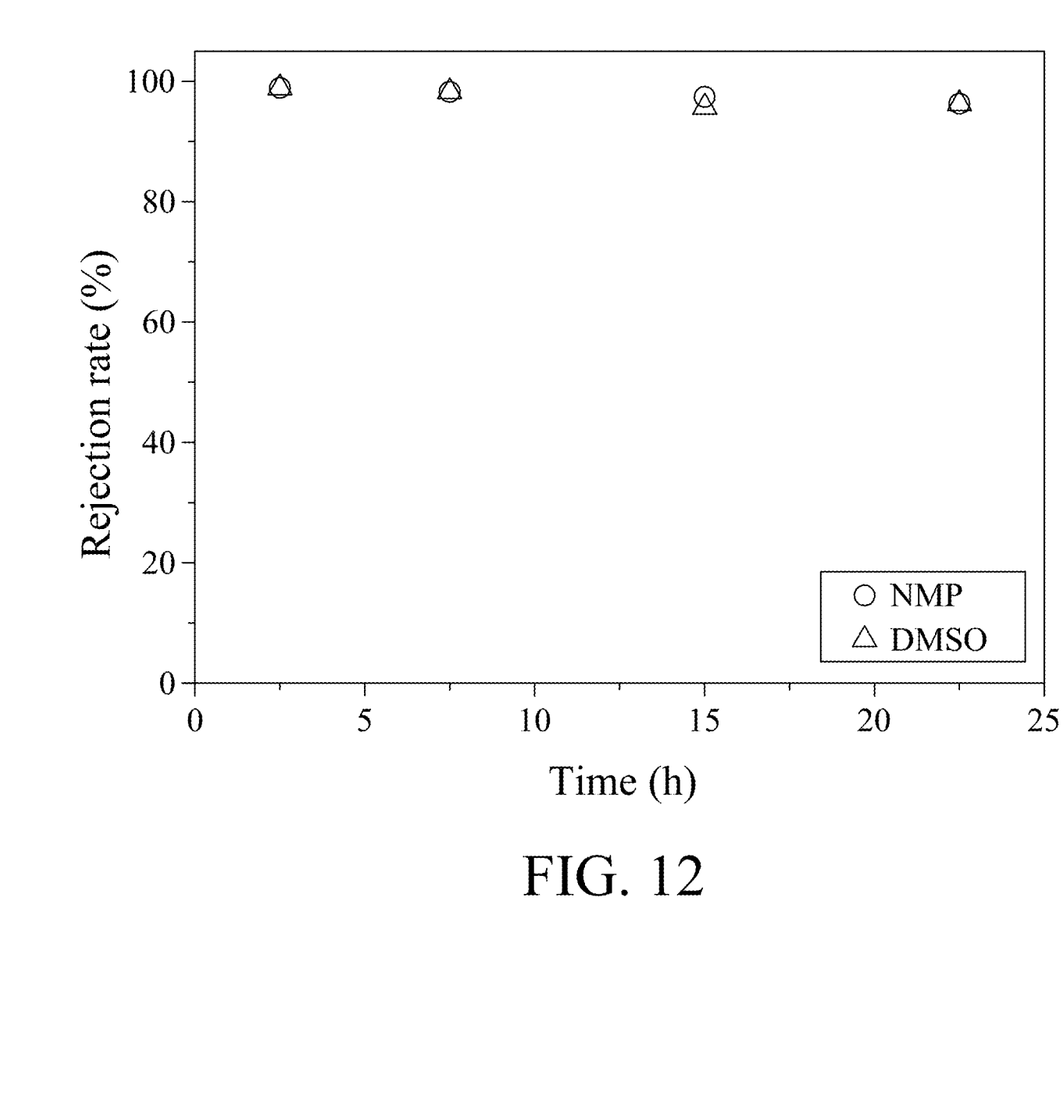
FIG. 12 is a dotted chart of a rejection rate (R) over time, illustrating a rejection effect of Example 1 on different organic solvents.

As shown in FIG. 12, the rejection rates (R) of the forward osmosis membrane Example 1 for both NMP and DMSO are in average maintained at 97% throughout 25 hours of the test period. Therefore, the forward osmosis membrane of the disclosure may be useful for blocking organic contaminants such as in an organic liquid waste when water purification was carried out in extreme environment.

4. Chemical Resistance:

Tests for chemical resistance against organic liquid waste containing NMP were performed on the forward osmosis membrane of Example 1 and on a commercially available forward osmosis membrane provided by the Industrial Technology Research Institute (ITRI). The commercially available forward osmosis membrane (hereinafter abbreviated as the ITRI FO membrane) includes a backing layer made of non-woven fabric, a support layer made of polyacrylonitrile disposed on the backing layer, and a selective layer made of polyamide disposed on the support layer. During the tests, 60 ml of organic liquid waste containing 50 wt % of NMP was used as the feed solution 710, and 60 ml of 5 M salt water was used as the draw solution 720 for performing forward osmosis for 15 hours.

Figure 13:
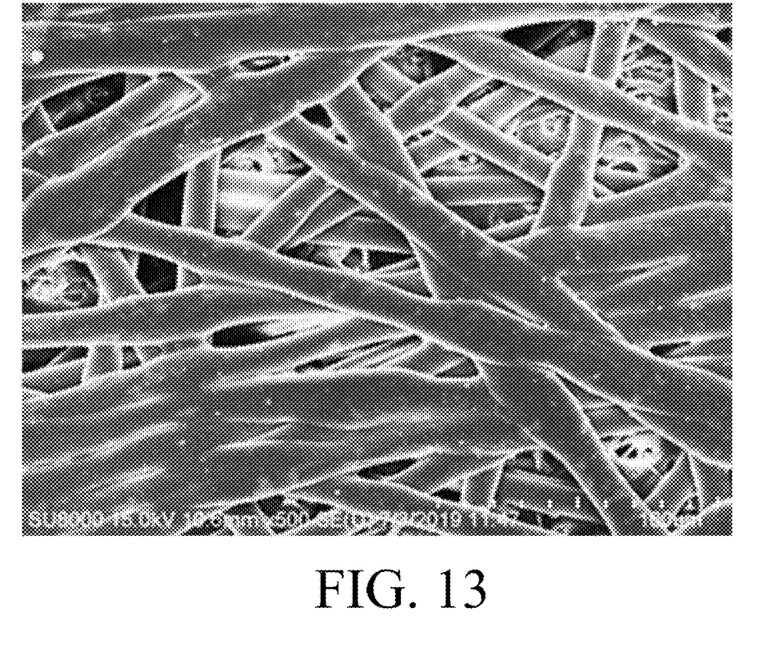
FIG. 13 is an SEM image illustrating a surface topography of a commercially available forward osmosis membrane after exposure to an organic liquid waste for 15 hours.
Figure 14:
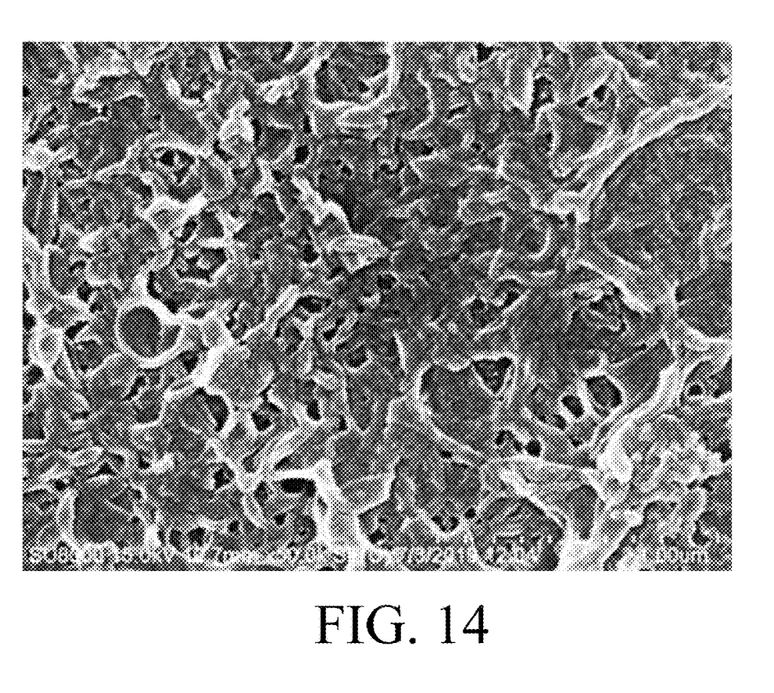
FIG. 14 is an SEM image illustrating a surface topography of the forward osmosis membrane of Example 1 after exposure to the organic liquid waste for 15 hours.

Referring to FIG. 13, after 15 hours of exposure to the organic liquid waste, surface topography of the ITRI FO membrane shows that most of the support layer and the selective layer were eroded, leaving the ITRI FO membrane with only the non-woven fabric backing layer. On the contrary, as shown in FIG. 14, the surface topography of the forward osmosis membrane of Example 1 shows that the forward osmosis membrane of Example 1 is able to maintain a complete structure after 15 hours of exposure to the organic liquid waste. Therefore, the hydrophilic support layer 4 of the forward osmosis membrane of the disclosure is proven to have an improved chemical resistance since the hydrophilic support layer 4 does not include polymeric materials (e.g., polyimide or polyacrylonitrile) that are soluble in organic liquid waste. Specifically, if the hydrophilic support layer 4 is filled with the materials that are soluble in organic liquid waste, it may be eroded easily by the organic liquid waste, thereby impairing the forward osmosis performance of the forward osmosis membrane.

In sum, by formation of the hydrophilic support layer 4 which includes a plurality of nanostructures 43, each including a carbon nanotube 431 and a hydrophilic film 432 coated around the carbon nanotube 431, and which has an outer layer 42 defined by the hydrophilic films 432 of the nanostructures 43 to prevent the selective layer 5 from penetrating into the hydrophilic support layer 4, the hydrophilic support layer 4 of the forward osmosis membrane of the disclosure will not be filled with the material forming the selective layer 5, and water can flow through the hydrophilic support layer 4 more easily, resulting in a higher water flux of the forward osmosis membrane of the disclosure. In addition, the ratio of the water flux to the reverse salt flux of the forward osmosis membrane of the disclosure is less than 0.5, which is advantageous for water purification. Further, the hydrophilic support layer 4 of the forward osmosis membrane of the disclosure has an improved chemical resistance compared to that of the conventional forward osmosis membrane.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A forward osmosis membrane having a high chemical resistance,
   comprising:
   a backing layer;
   a selective layer; and
   a hydrophilic support layer being sandwiched between said backing layer and said selective layer and including a plurality of nanostructures,
   each of said nanostructures includes a carbon nanotube and a hydrophilic film coated around said carbon nanotube,
   wherein
   said hydrophilic support layer has an outer layer which is defined by said hydrophilic film of each of said nanostructures being in contact with each other, so as to prevent said selective layer from penetrating into said hydrophilic support layer.

2. The forward osmosis membrane according to claim 1, wherein said hydrophilic support layer has a thickness ranging from 1 μm to 10 μm.

3. The forward osmosis membrane according to claim 1, wherein said hydrophilic film is made of a material selected from the group consisting of polydopamine, poly (acrylic acid), polyaniline, polycaprolactone, and combinations thereof.

4. The forward osmosis membrane according to claim 1, wherein said selective layer is made of a material selected from the group consisting of polyamide, polyamide-imide, poly (piperazine amide), and combinations thereof.

* * * * *